United States Patent
Oh

(10) Patent No.: US 10,205,996 B2
(45) Date of Patent: Feb. 12, 2019

(54) IMAGE PROCESSING APPARATUS AND IMAGE PROCESSING METHOD

(71) Applicant: SAMSUNG ELECTRONICS CO., LTD., Suwon-si (KR)

(72) Inventor: Sung-bo Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/575,508

(22) Filed: Dec. 18, 2014

(65) Prior Publication Data
US 2015/0326918 A1  Nov. 12, 2015

(30) Foreign Application Priority Data
May 12, 2014 (KR) .................. 10-2014-0056729

(51) Int. Cl.
| | |
|---|---|
| H04N 21/45 | (2011.01) |
| H04N 7/01 | (2006.01) |
| H04N 5/44 | (2011.01) |
| H04N 21/4402 | (2011.01) |
| H04N 21/436 | (2011.01) |
| H04N 21/4363 | (2011.01) |
| G09G 5/00 | (2006.01) |
| H04N 7/10 | (2006.01) |

(52) U.S. Cl.
CPC ......... *H04N 21/4516* (2013.01); *G09G 5/006* (2013.01); *H04N 5/44* (2013.01); *H04N 7/0122* (2013.01); *H04N 7/0125* (2013.01); *H04N 21/436* (2013.01); *H04N 21/4363* (2013.01); *H04N 21/43615* (2013.01); *H04N 21/43635* (2013.01); *H04N 21/4402* (2013.01); *H04N 21/440272* (2013.01); *G09G 2370/047* (2013.01); *G09G 2370/12* (2013.01); *G09G 2370/14* (2013.01); *H04N 7/108* (2013.01)

(58) Field of Classification Search
None
See application file for complete search history.

(56) References Cited

U.S. PATENT DOCUMENTS

| | | | | |
|---|---|---|---|---|
| 2007/0044138 | A1* | 2/2007 | Yang | G06F 1/3218 725/151 |
| 2013/0207942 | A1* | 8/2013 | Imai | G09G 5/003 345/204 |
| 2015/0020088 | A1* | 1/2015 | Velasco | H04N 21/2343 725/25 |
| 2015/0042879 | A1* | 2/2015 | Chiang | G09G 5/005 348/469 |

* cited by examiner

Primary Examiner — Samira Monshi
(74) Attorney, Agent, or Firm — Sughrue Mion, PLLC

(57) ABSTRACT

An image processing apparatus and an image processing method which graft and standardize interface technologies to peripheral apparatuses is provided. The image processing apparatus includes a first signal processor configured to process a content image and output the processed content image using a differential pair method through a transmission lane, a second signal processor configured to convert a signal format of the processed content image of the first signal processor into a signal format supportable by an image display apparatus and output the converted content image to the image display apparatus, and a controller configured to change the output features of the first signal process based on a resolution of the image display apparatus.

10 Claims, 6 Drawing Sheets

IMAGE PROCESSING APPARATUS AND IMAGE PROCESSING METHOD

CROSS-REFERENCE TO RELATED APPLICATION

This application claims priority from Korean Patent Application No. 10-2014-0056729 filed on May 12, 2014 in the Korean Intellectual Property Office, the disclosure of which is incorporated herein by reference in its entirety.

BACKGROUND

1. Field

Apparatuses and methods consistent with exemplary embodiments relate to an image processing apparatus and an image processing method, and more particularly, to an image processing apparatus and an image processing method which graft and standardize the interface technologies to peripheral apparatuses such as a set-top box (STB).

2. Description of the Related Art

In general, a television (TV) is a device which receives, through an antenna, a broadcast signal including an image signal and an audio signal, performs signal processing including detection, tuning, and demodulation, and enables a user to watch the content of the broadcast signal through a monitor, or is a device which displays a signal which is input from a videocassette recorder (VCR) or an audio, or the like. In addition to restoring a broadcast signal or playing back of a signal input from outside, a multi-functional digital TV, which grafts advanced digital image compression technology such as Moving Picture Experts Group (MPEG) or large capacity information storage technology such as a hard disc and a compact disc, has been developed.

In the case of an ordinary liquid crystal display (LCD) TV or a plasma display panel (PDP) TV, an image data of each pixel is transmitted to a column driver which provides a signal to a vertical line of a panel, and by using a row driver which provides a signal to a horizontal line of the panel, a light-emitting time of each pixel is controlled. Thus, a cable for data communication in accordance with low voltage differential signaling (LVDS) specification (or protocol) can be connected through a data communication terminal to a TV. In this case, data transmitted in accordance with LVDS specification by a low voltage parallel communication interface is a pixel data stream which is a type of stream composed of pixel data that is divided by each pixel which consists of one screen frame. Each pixel data which consists of a pixel data stream is transmitted to a column driver in charge of each pixel, respectively.

Recently, for example, V-by-One, which runs three times or more faster than LVDS used for an LCD TV and has 40% or more higher performance than an ultra-speed connector, has been developed. With the development of V-by-One, domestic manufacturers have quickly adopted V-by-One connectors to realize full high-definition (HD). The V-by-One can achieve a high speed of 3.5 Gbps for data transmission, and is known to be the best-performing product.

It is now commonplace to interlock a TV with audio/video (AV) peripheral devices such as the STB and a Blu-ray disc (BD) player, but there is a drawback in that these peripheral devices may not rapidly cope with technical development of a TV. In other words, as to a TV, relevant chips are manufactured and used in accordance with development of the technologies used for a TV, but as to the BD player, chips to be used for the developed technologies have not been developed at the right time.

For the above reason, relevant chips for a TV are merely adopted for peripheral devices, but in this case, a problem is faced in that it is difficult to make or change a design to optimally realize performance of a TV.

SUMMARY

One or more exemplary embodiments provide, amid development of interface technologies to transmit a signal to a panel of an image display apparatus such as V-by-One, an image processing apparatus and an image processing method to graft and standardize the aforementioned interface technologies to peripheral apparatuses such as a set-top box (STB).

According to an aspect of an exemplary embodiment, there is provided an image processing apparatus including a first signal processor configured to process a content image and output the processed content image using a differential pair method through a transmission lane, a second signal processor configured to convert a signal format of the processed content image of the first signal processor into a signal format supportable by an image display apparatus and output the converted content image to the image display apparatus, and a controller configured to control the first signal process to change output features of the first signal processor based on a resolution of the image display apparatus.

The first signal processor may include a decoder configured to decode the input content image, a scaler configured to scale the decoded content image, and a first signal outputter configured to output the scaled content image using the differential pair method, wherein the second signal processor may include a signal receiver configured to receive the content image in the differential pair method outputted from the first signal outputter, a signal converter configured to convert a signal format of the received content image into a signal format supportable by the image display apparatus, and a second signal outputter configured to output the converted content image to the image display apparatus.

The second signal outputter may output the converted content image in a high definition multimedia interface (HDMI) signal format or a mobile high-definition link (MHL) signal format.

Each of the first decoder, the scaler, the first signal outputter, the signal receiver of the second signal processor, the signal converter, and the second signal outputter may be disposed on a single chip or on a plurality of separate chips.

The controller may be configured to change the output features of the first signal processor, may determine data speed of a content image output through the transmission lane based on the resolution, and may determine the number of transmission lanes needed to optimally output the processed content image based on the determined speed.

The controller may determine, based on the resolution, a minimum number of transmission lanes capable of data transmission for a content image as the number of lanes needed to optimally output the processed content image.

The controller may receive from the image display apparatus information related to the resolution through connecting HDMI and use the information to determine the output features of the transmission lane.

According to an aspect of another exemplary embodiment, there is provided an image processing method including outputting by a first signal processor a processed content image using a differential pair method through a transmission lane, converting by a second signal processor a signal format of the processed content image into a signal format supportable in an image display apparatus and outputting the converted content image to the image display apparatus, and changing the output features of the first signal processor based on a resolution of the image display apparatus.

The outputting the processed content image using the first differential pair method may include decoding the content image, scaling the decoded content image, and outputting the scaled content image using the differential pair method, wherein the outputting the image to the image display apparatus may include receiving the output content image using the differential pair method, converting a signal format of the received content image into a signal format supportable in the image display apparatus, and outputting the converted content image to the image display apparatus.

The outputting the image to the image display apparatus may include outputting the converted content image in a high definition multimedia interface (HDMI) or a mobile high-definition link (MHL) signal format.

Each of the decoding, the scaling, and the output of the first signal processor in the differential pair method, and the receiving the content image, the converting to the signal format, and the outputting to the image display apparatus of the second signal processor may be performed by a single chip or by a plurality of separate chips.

The converting may include, to change the output features of the first signal processor, determining data speed of a content image output through the transmission lane based on the resolution, and determining the number of transmission lanes needed to optimally output the processed content image based on the determined speed.

The converting may include, to change the output features of the transmission lane, determining a minimum number of transmission lanes capable of data transmission for content image as the number of lanes needed to optimally output the processed content image based on the resolution.

The converting may include receiving from the image display apparatus information related to the resolution and using the information to determine the output features of the transmission lane.

According to another aspect of an exemplary embodiment, an image processing apparatus includes a first signal processor configured to receive a content image, process the content image according to a differential pair method through a transmission lane, and output the processed content image, and a second signal processor configured to receive the processed content image, convert the processed content image to a signal format supportable by a display, and output the converted image, where output features of the first signal processor are modified according to characteristics of the display.

The image processing apparatus may further include a controller configured to determine data speed of the content image output through the transmission lane according to the characteristics of the display and determines the number of transmission lanes needed to optimally output the processed content image according to the determined data speed.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
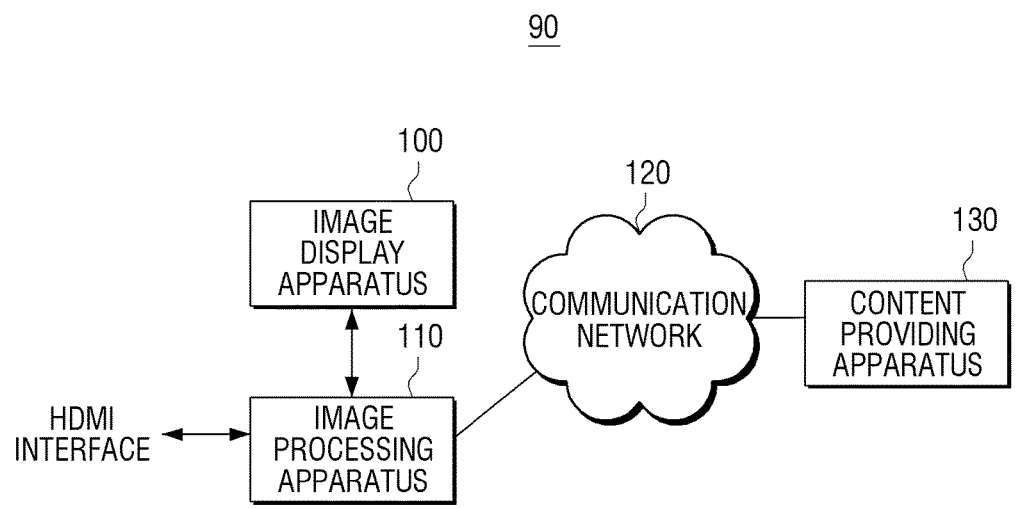
FIG. 1 is a view illustrating an image processing system according to an exemplary embodiment.

Certain exemplary embodiments are described in detail below with reference to the accompanying drawings.

In the following description, like drawing reference numerals are used for like elements. The matters defined in the description, such as detailed construction and elements, are provided to assist in a comprehensive understanding of the exemplary embodiments. However, exemplary embodiments may be practiced without those specifically defined matters. Also, well-known functions or constructions are not described in detail because they would obscure the application with unnecessary detail.

FIG. 1 is a view illustrating an image processing system according to an exemplary embodiment.

As illustrated in FIG. 1, an image processing system 90 according to an exemplary embodiment includes at least one of an image display apparatus 100, an image processing apparatus 110, a communication network 120, and a content providing apparatus 130.

Here, some of the components, such as the communication network 120 and the content providing apparatus 130, may be omitted, or some of the components, such as the image processing apparatus 110, may be incorporated with other components, such as the image display apparatus 100. For easier understanding, the image processing system 90 will be described as a single component.

The image display apparatus 100 may be an image display apparatus in a touch screen type, or may include a field emission display such as organic light emitting diode (OLED) or a light-receiving display apparatus such as an LCD apparatus. Here, a display apparatus may be a computer or a mobile phone which is not a TV. The light-receiving display apparatus indicates that a separate backlight which provides light is included. The backlight may include a light emitting diode (LED).

The image display apparatus 100 according to an exemplary embodiment processes a content image provided by the image processing apparatus 110. Herein, the content image may be a broadcasting signal or an image signal provided by peripheral apparatus such as a BD player. Alternatively, the image signal may be a signal provided by a personal video recorder (PVR) such as a personal camcorder.

To process a content image, the image display apparatus 100 may be connected with the image processing apparatus 110 through a communication cable, for example, an HDMI cable. Accordingly, the image display apparatus 100 may provide to the image processing apparatus 110 information related to a resolution of the display apparatus 100, which is stored in an internal memory during the initial operation along with the image processing apparatus 110. The information related to the resolution of the display apparatus 100 indicates, for example, extended display identification data (EDID), and may include a resolution supportable by the image display apparatus 100, color space, color depth, and audio format, and content format information which the image display apparatus 100 may input to the HDMI.

It is preferable that the image processing apparatus 110 include one interface which is the same as the communication interface, such as V-by-One, within the image display apparatus 100. In other words, when the image processing apparatus 110 is configured to use a high-performance chip which is applied to the image display apparatus 100, a high-performance image processing apparatus 110 can be embodied. Further, even if a separate chip is not developed for the image processing apparatus 110, when a chip is developed the image display apparatus 100, a cost for developing a high-performance image processing apparatus 110 will be reduced.

During an initial operation, the image processing apparatus 110 may receive from the image display apparatus 100 information related to a resolution of the image display apparatus 100 and store the information. In one exemplary embodiment, information related to the resolution of the image display apparatus 100 may be prestored in the internal memory and use of the information is possible. The image processing apparatus 110 determines a transmission line based on stored information related to the resolution. For example, an output lane, for realizing V-by-One, or a transmission speed of an output lane is determined, and using the stored information, the image processing apparatus 110 determines the optimal number of output lanes and transmission speed. Herein, the transmission line may have the same or a similar meaning as the lane, which will be explained in greater detail herein. For example, for transmissions having a resolution of 1920×1080p, two lanes of V-by-One are necessary, as one lane may transmit up to pixel clock video data of 75 megahertz (MHz). Accordingly, for a transmission having a signal of 1920×1080p, a transmission of a pixel clock by 148.5 MHz is necessary, and thus, two lanes must be used. If there are enough lanes available, the transmission speed may be increased instead of reducing the number of lanes.

For example, for transmissions having a resolution and frame rate of 3840×2160p/60 Hertz (Hz), respectively, 8 lanes of V-by-One are necessary. In this case, it is assumed that one lane may transmit clock video data up to 75 MHz, but if seven lanes are to be used, transmission speed of pixel clock video data of 75 MHz may be adjusted to, for example, to 85.7 MHz.

As described above, the image processing apparatus 110 determines an optimal environment of V-by-One based on information related to the resolution of the image display apparatus 100. In other words, when there are insufficient lanes to provide the transmission, or in order to reduce error occurrence, the number of output lanes and transmission speed of the output lanes are determined. In addition, the content image which is output through the determined lane, a may be converted to a specific signal format by the image processing apparatus 110, such as an HDMI signal format, which corresponds to a signal format of the image display apparatus 100. The HDMI signal format is embodied under the assumption that bilateral communication between the image display apparatus 100 and the image processing apparatus 110 which are connected using a HDMI cable is available. However, when the image processing apparatus 110 stores information related to resolution of the image display apparatus in the internal memory, HDMI signal format should not necessarily be used. For example, when the interface includes HDMI and MHL, information related to the resolution of the image display apparatus 100 may be obtained by the image processing apparatus 110, and thus, the interface signal is applicable when MHL connection is implemented.

Therefore, it is desirable that the signal format which is finally output for transmitting the processed content image from the image processing apparatus 110 coincides with the input signal format of the image display apparatus 100.

The communication network 120 includes both wire and wireless communication networks. Herein, a wire network includes an internet network such as a cable network or a public switched telephone network (PSTN), and the wireless communication network includes code division multiple access (CDMA), wideband code division multiple access (WCDMA), global system for mobile communication (GSM), evolved packet core (EPC), long term evolution (LTE), Wibro network, or the like. Therefore, when the communication network 120 is a wire communication network, an access point may access a telephone exchange, but in a case of the wireless communication network, data may be processed by accessing serving GPRS support node (SGSN) or gateway GPRS support node (GGSN) which is operated by a communication provider, or accessing various telephone repeaters such as base station transmission (BTS), NodeB, and e-NodeB.

In addition, the communication network 120 includes the access point (AP) such as Femto or Pico. Herein, Femto or Pico is divided according to the number of image display apparatuses 100 or image processing apparatuses 110 that can be accessed based on a category of a small-scale base station. An AP includes near field communication module for performing near field communication such as Zigbee and Wi-Fi with the image processing apparatus 110. In the exemplary embodiment, the near field communication may be performed using, for example, Bluetooth, Zigbee, infrared data association (IrDA), radio frequency (RF) such as ultra-high frequency (UHF) and very high frequency (VHF), ultra wideband (UWB), and Wi-Fi. Accordingly, the AP extracts a location of a data packet, designates the optimal communication path of the extracted location, and transmits the data packet, through the designated communication path, to the next apparatus, for example, the image processing apparatus 110.

The content providing apparatus 130, for example, includes a broadcast server which is operated by a broadcasting station. Alternatively, the content providing apparatus 130, even if not a broadcasting station, may include a server of a content image provider which provides various content images.

Figure 2:
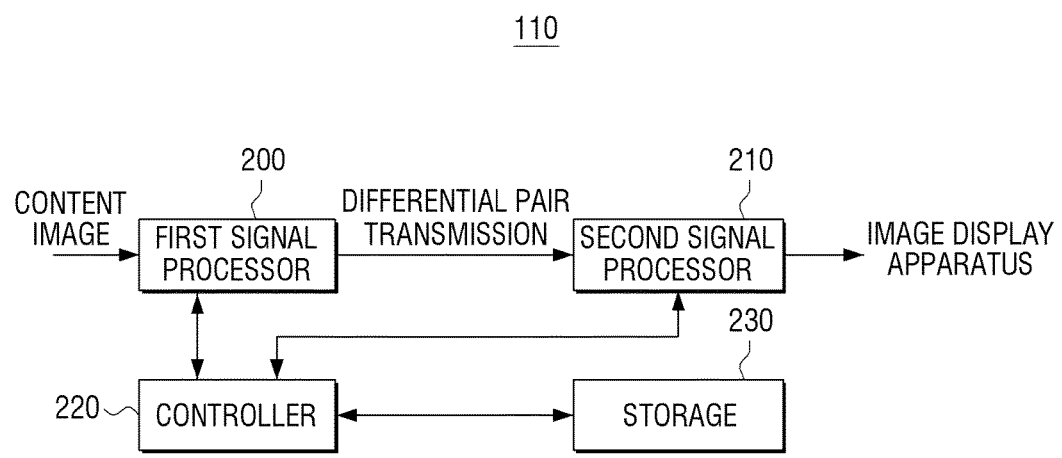
FIG. 2 is a block diagram illustrating an image processing apparatus of FIG. 1 according to an exemplary embodiment.

FIG. 2 is a block diagram illustrating an image processing apparatus of FIG. 1 according to the first exemplary embodiment.

For convenience of explanation, when referring to FIG. 2, along with FIG. 1, the image processing apparatus 110 according to the exemplary embodiment includes a first signal processor 200, a second signal processor 210, and a controller 220. In addition, the image processing apparatus may further include a storage 230.

Herein, the first signal processor 200 processes the input content image using a decoding and scaling process and outputs the processed content image as the first signal format, that is, outputs the processed content image data using the differential pair method. Herein, the differential pair method includes V-by-One. Accordingly, the image display apparatus 100 processes data of the differential pair method using a V-by-One interface, which has been described above.

In addition, the first signal processor 200, when outputting image data of the content image using a differential pair method, outputs data according to the number of transmission lines. In other words, the number of output lanes is determined according to the differential pair method, and the transmission speed may be determined and the data may be output. In this exemplary embodiment, the first signal processor operates under the control of the controller 220. In other words, the controller 220 may determine the number of lanes usable in the first signal processor 200 according to information received from the image display apparatus 100. If the first signal processor 200 has enough lanes to provide the proper resolution, the number of lanes will be determined only. However, when the number of lanes is not enough, or there is a request from a system designed to reduce error occurrences, the number of lanes and the transmission speed may be determined at the same time by the first signal processor 200, and upon this determination, the output feature (i.e., at least one of the number of lanes used during output and the speed of the transmission) of the first signal processor 200 is determined. As such, the first signal processor 200 may include a switching device to select a path of the lane under the control of the controller 220, and may include an internal clock signal generator to change a processing speed.

The second signal processor 210 changes and outputs the signal of the first signal format, which is processed in the first signal processor 200, to the second signal format. The second signal format is the signal format of the image display apparatus 100. For example, when the image display apparatus 100 processes a signal in HDMI format, it is desirable to change and output to HDMI format.

According to another exemplary embodiment, when the image display apparatus 100 process a signal in MHL format, it is desirable to change and output to MHL format.

The controller 220 controls overall operations of the first signal processor 200, the second signal processor 210, and the storage 230 within the image processing apparatus 110. For example, the controller 220, through the second signal processor 210 or a separate communication interface during initial operation, may input information related to a resolution of the image display apparatus 100 and store the information in the storage 230. By analyzing the stored information related to the resolution, the controller may determine the number of lanes the first signal processor 200 must use, or the number of lanes and the transmission speed of the first signal processor 200, and control the first signal processor 200 according to the determination result. More specifically, as discussed above, the switching device and the clock signal generator within the first signal processor 200 may be controlled according to the stored information.

Upon a user's request, the storage 230 may pre-store information related to a resolution of the image display apparatus 100. However, during the initial operation of the image processing apparatus 110, the storage 230 may receive information stored in the internal memory of the image display apparatus 100 through communication with the image display apparatus 100, and store the received information. In addition, upon request by the controller 220, the information corresponding to the received information is output to the image display apparatus 100.

Figure 3:
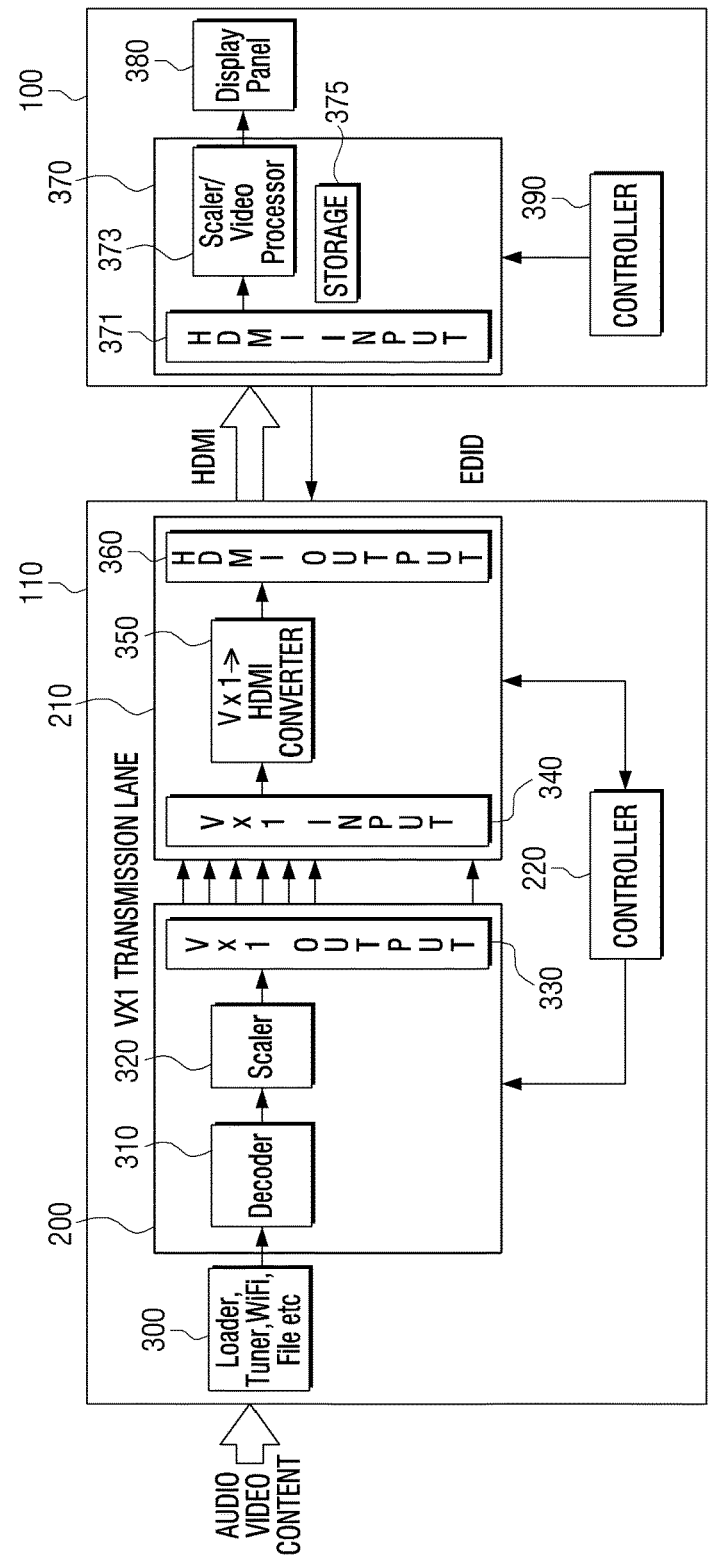
FIG. 3 is a view provided to explain an image processing apparatus of FIG. 1 according to another exemplary embodiment and a connection relation with the image display apparatus.

FIG. 3 is a view provided to explain an image processing apparatus of FIG. 1 according to another exemplary embodiment, as well as a connection relation of the image processing apparatus with the image display apparatus.

For convenience of explanation, when referring to FIG. 3 along with FIGS. 1 and 2, the image processing apparatus 110 according to an exemplary embodiment, when compared to the image processing apparatus 110 of FIG. 2, may further include a signal receiver 300. When the input content image is a broadcast signal, the signal receiver 300 may further include a demodulator, a tuner, or a near field communication module.

In addition, the first signal processor 200 of FIG. 2 includes the decoder 310, the scaler 320, and the V-by-One outputter 330. The second signal processor 210 as shown in FIG. 2 includes a V-by-One inputter 340, a signal converter 350, and a HDMI outputter 360. In this case, it is desirable that each component of the first signal processor 200 and the second signal processor 210 be composed of a single chip, respectively. In other words, the image processing apparatus 110 may configure the first signal processor 200 with a single chip, and configure the second signal processor 210 with a single chip, and thus, may use two chips. However, each component may be configured as separate chips. When configuring as separate chips, the cost of the apparatus may increase, but additional exemplary embodiments may be achieved.

The decoder 310 processes decoding of a content image, that is, an image data, of a channel selected by tuning of a user. In other words, the input content image is encoded, and is decrypted by the decoder 310. Contents may include broadcast signals which are input from an optical disc, file, and tuner or the contents input from Wi-Fi, but these contents are input to the decoder 310, and the decoder 310 decodes the compressed contents.

The scaler 320 may perform data reprocessing, such as video processing of data of a decoded content image and bit conversion, that is, the operations to change resolution. For example, the resolution of 1280×720p may be input by the scaler 320, and be converted to 1920×1080p. Such a process of converting resolution is operated by receiving a command from the controller 220. In this case, the scaler 320, according to the control of the controller 220, may convert the serially input data to parallel input data, and output the converted data to the V-by-One outputter 330. In general, three bytes of data may be processed per one lane, and thus, data directed to sub pixels of R, G, B, which are configured as one pixel, may be processed. Accordingly, the scaler 320, when using two lanes, according to the control of the controller 220, may process data by providing the first pixel data to the first lane, the second pixel data to the second lane, and the third pixel data to the first lane again.

The V-by-One outputter 330 outputs the signal with a converted resolution, that is, content image data, through the V-by-One interface. The V-by-One outputter 330, according to the control of the controller 220, may output data with a selected singular or a plurality of differential pairs, i.e., lanes. For example, a specific path for outputting content image data may be selected by controlling the switching device in the V-by-One outputter 330 by the controller 220.

The V-by-One inputter 340 of the second signal processor 210 receives data which is connected to the V-by-One outputter 330 of the signal processor 200 and is provided to a certain lane. Based on the received data, the controller 220 may determine to which lane of the V-by-One inputter 340 the image data is input, which is determined using information related to a resolution of the image display apparatus 100.

The signal converter 350 converts the data from the first signal format, that is, the data of V-by-One format, which is provided from the V-by-One inputter 340, to the signal format of the image display apparatus 100, for example, HDMI signal format. V-by-One, when connected to the image display apparatus 100, may not read information related to the format type image display apparatus 100 supports. On the other hand, in the case of a HDMI interface, the corresponding information may be read using a display data channel (DDC). In other words, a HDMI interface or an MHL interface is required in order to find a data format which is supportable by an external input of the image display apparatus 100. In order to obtain such information, the signal converter 350 converts data from a V-by-One interface into a HDMI format.

The HDMI outputter 360 may be configured as a single body with the signal converter 350, or a separable body. The HDMI outputter 360 may have an outputter which outputs a signal as a format defined by HDMI regulation, and output the signal output type as transmission minimized differential signaling (TMDS). The signal output from the HDMI outputter 360 is sent to the image display apparatus 100 through a HDMI cable.

As described earlier, when further referring to HDMI, the controller 220 controls overall operations of the signal receiver 300, the first signal processor 200, and the second signal processor 210 illustrated in FIG. 3. For example, while the HDMI cable is connected to the image display apparatus 100, or if the HDMI cable is connected when the image display apparatus 100 and the image processing apparatus 110 are on, the controller 220 of the image processing apparatus 110 reads extended display identification data (EDID) information of the image display apparatus 100 through the HDMI interface. In the EDID of the image display apparatus 100, the image display apparatus 100 is stored as a signal format which can be input through a HDMI port, and the image processing apparatus 110 may obtain the information. From among EDID information, the image processing apparatus 110 can also determine supportable 3D format information, the maximum transition minimized display signaling (TMDS) clock which the image display apparatus 100 may receive, and the maximum image data bit number which the image display apparatus 100 may receive. Such information exerts influence over the maximum frequency which V-by-One needs to output. This information may be determined by the controller 220 and may be used to determine the number of lanes needed for V-by-One to output properly.

According to another exemplary embodiment, the image display apparatus 100 of FIG. 3 may include a signal processor 370, a display panel 380, and a controller 390. The signal processor 370 may include a HDMI inputter 371, a scaler/video processor 373, and a storage 375.

The HDMI inputter 371 is connected with the HDMI outputter 360 of the image processing apparatus 110 through the HDMI cable. Alternatively, the HDMI inputter 371 may be connected through the MHL cable. The HDMI inputter 371 may receive HDMI format content image data from the image processing apparatus 110 through the HDMI cable, but may provide information on a resolution stored in the storage 375, under the control of the controller 390.

The scaler/video processor 373 may additionally convert the output signal to a resolution suitable for the display panel 380 or adjusting color difference, etc.

The storage 375 may store information related to a resolution of the image display apparatus 100, and during an initial operation when power is on, may output information related to a resolution which is stored in the image processing apparatus 110 under the control of the controller 390.

A display panel 380, for example, a LCD or an OLED panel, displays a content image provided by the image processing apparatus 110 on a screen.

The controller 390 functions to control the components such as the HDMI inputter 371, the scaler/video processor 373, and the storage 375 in the image display apparatus 100. For example, the controller 390 retrieves information related to a resolution stored in the storage 375 and performs operations to transmit the information to the image processing apparatus 110.

Figure 4:
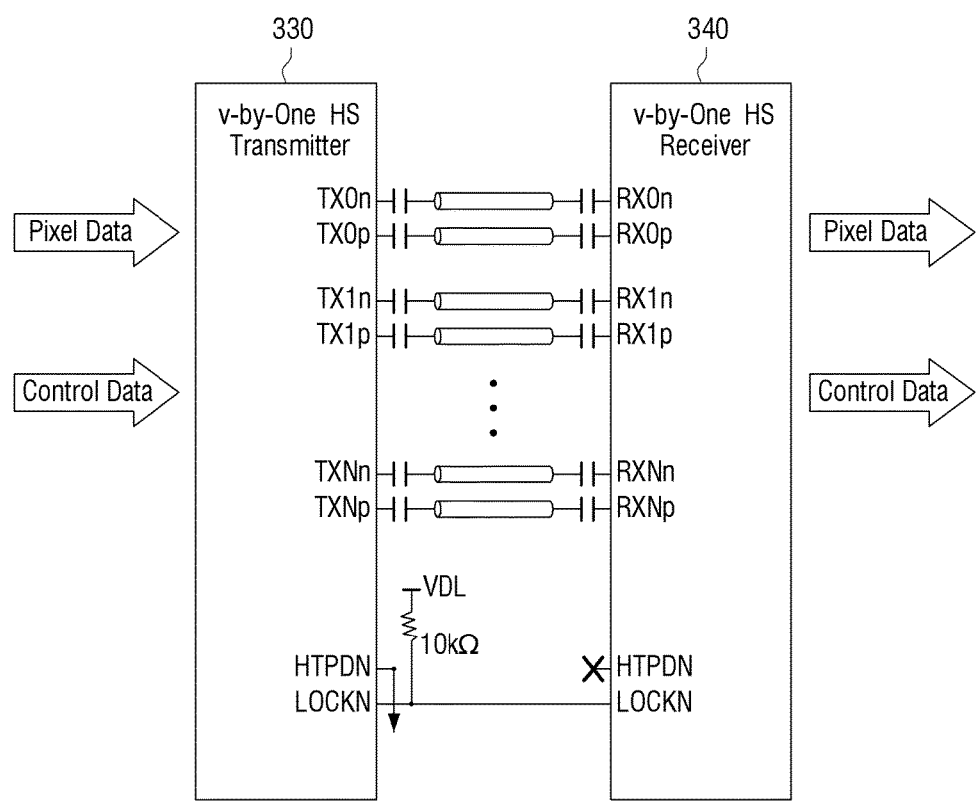
FIG. 4 is a view illustrating the connection of the first signal processor of FIG. 3 with the second signal processor.

FIG. 4 is a view specifying the connection of the first signal processor of FIG. 3 with the second signal processor.

For convenient explanation, when referring to FIG. 4 along with FIG. 3, the V-by-One outputter 330 which determines the output features for the first signal processor 200 of FIG. 3 may determine the input features for the V-by-One inputter 340 of the second signal processor 210 and a plurality of differential pairs, i.e., lanes. The V-by-One is used for transmitting high speed a signal with a differential pair, that is, the V-by-One is used to transmit a signal to a communication line having a singular or a plurality of differential pairs. According to an exemplary embodiment, the singular differential pair is a lane. The singular differential pair is mainly used for communication between the display panel 380 of the image display apparatus 100 and the signal processing processor, and the number of lanes is fixed according to a resolution of the display panel 380.

However, according to an exemplary embodiment, information related to a signal format which the sink for the image display apparatus 100 may receive through the HDMI port may be obtained by converting the signal which is output to V-by-One to HDMI or MHL and is output to the image display apparatus 100. In the case of HDMI, by obtaining EDID information of the image display apparatus 100, which is a sink apparatus, video format information supportable by the sink apparatus may be obtained. Based on the obtained information, the image processing apparatus 110 may determine the speed of data which is output through V-by-One of the sink apparatus, and the number of lanes which are optimally required may be determined by calculating how many lanes are required using the determined speed information.

For example, if V-by-One interface is used with the image display apparatus 100, when a same chip having a fixed lane is used by the image processing apparatus 110, it may be necessary to change the resolution of the output image for the image processing apparatus 110, and therefore, it is possible to optimize the number of lanes according to a resolution and change on a real time basis. Here, it seems desirable to see that the real-time basis means whenever the image display apparatus 100 is replaced.

According to the exemplary embodiment, the image processing apparatus 110 may determine, i.e., select, the number of lanes based on information on resolution of the image display apparatus 100, and output pixel data of the input content image.

For example, determination of the number of lanes according to the exemplary embodiment is explained with reference to Table 1, which indicates video data format and the number of lanes for optimally displaying an image according to the video data format.

TABLE 1

| Resolution | Refresh rate (Pixel clock) | color depth | NO of data lane* |
|---|---|---|---|
| HD ex. 1280 × 720p | 60 Hz (74.25 MHz) | 18/24/30/36 bit | 1 |
| | 120 Hz (148.5 MHz) | 18/24/30/36 bit | 2 |
| | 240 Hz (297 MHz) | 18/24/30/36 bit | 4 |

TABLE 1-continued

| Resolution | Refresh rate (Pixel clock) | color depth | NO of data lane* |
|---|---|---|---|
| Full HD ex. 1920 × 1080p | 60 Hz (148.5 MHz) | 18/24/30/36 bit | 2 |
| | 120 Hz (297 MHz) | 18/24/30/36 bit | 4 |
| | 240 Hz (594 MHz) | 18/24/30/36 bit | 8 |
| | 480 Hz (1188 MHz) | 18/24/30/36 bit | 16 |
| Cinema Full HD ex. 2560 × 1080p | 60 Hz (185 MHz) | 18/24/30 bit | 2 |
| | 120 Hz (370 MHz) | 18/24/30 bit | 4 |
| | 240 Hz (740 MHz) | 18/24/30 bit | 8 |
| 4K × 2K ex. 3840 × 2160p | 60 Hz (594 MHz) | 18/24/30/36 bit | 8 |
| | 120 Hz (1188 MHz) | 18/24/30/36 bit | 16 |
| | 240 Hz (2376 MHz) | 18/24/30/36 bit | 32 |

As shown in Table 1, the minimum number of lanes necessary according to a video resolution format for a V-by-One interface is determined. In this case, a video pixel clock in which one lane transmits may be 75 MHz.

For example, if it is assumed that the maximum resolution which the image display apparatus 100 may support is 1920×1080P/60 Hz, color depth is supportable up to 12 bits, 3D frame packing is supportable, and a maximum clock of TMDS is up to 225 MHz, the maximum TMDS frequency which may be output from the image processing apparatus 110 while displaying a 2D content is 225 MHz. Accordingly, when outputting 1080P/60 Hz 12 bit video of 225 MHz using the V-by-One outputter 330, the signal needs to be converted to HDMI and the final output should be made through HDMI terminal. In order to transmit video data which has 225 MHz pixel clock, from the V-by-One outputter 330, data is transmitted using a 75 MHz transmission clock for one lane, so three or more lanes are required for V-by-One. Therefore, the number of lanes may be assigned in accordance with several cases for data transmission. However, at least three lanes are required. As described above, by using information of the image display apparatus 100 which is obtained through HDMI, the number of V-by-One lanes may be automatically optimized and determined by the controller 220.

The optimized number of lanes may be determined to be the minimum number of lanes which may be normally transmitted from the image processing apparatus 110. In addition, the number of lanes may be fixed and the data transmission speed of each lane may be adjusted and then the data may be transmitted. In other words, there is a method for transmitting data using the minimum number of lanes to determine optimized number of lanes. In order to determine the optimized number of lanes, the number of lanes may be optimized by increasing or decreasing the transmission speed of lanes. For example, when increasing transmission speed to transmit an image signal of 1080P/60 Hz 12 bit, if transmission is done by 112.5 MHz per lane, a minimum of two lanes is required. Thus, the number of assigned lanes may be two and the data may be transmitted. Another method is to transmit using four lanes. In this case, if transmission speed is at 56.25 MHz per lane, transmission of 1080P/60 Hz 12 bit using four lanes in the same manner is possible. Using the V-by-One method, the possibility of errors may be reduced because additional lanes are used and the transmission speed is reduced.

According to an exemplary example, optimizing lanes for transmission of V-by-One may be performed in a similar manner. According to another exemplary embodiment, when connected to the image display apparatus 100, if 8 bit color depth contents of 1080P/24 Hz 3D frame packing format is to be played, a TMDS clock of 148.5 MHz is necessary. Accordingly, the required number of lanes of V-by-One may be automatically set and the data may be output after setting the number of lanes.

Figure 5:
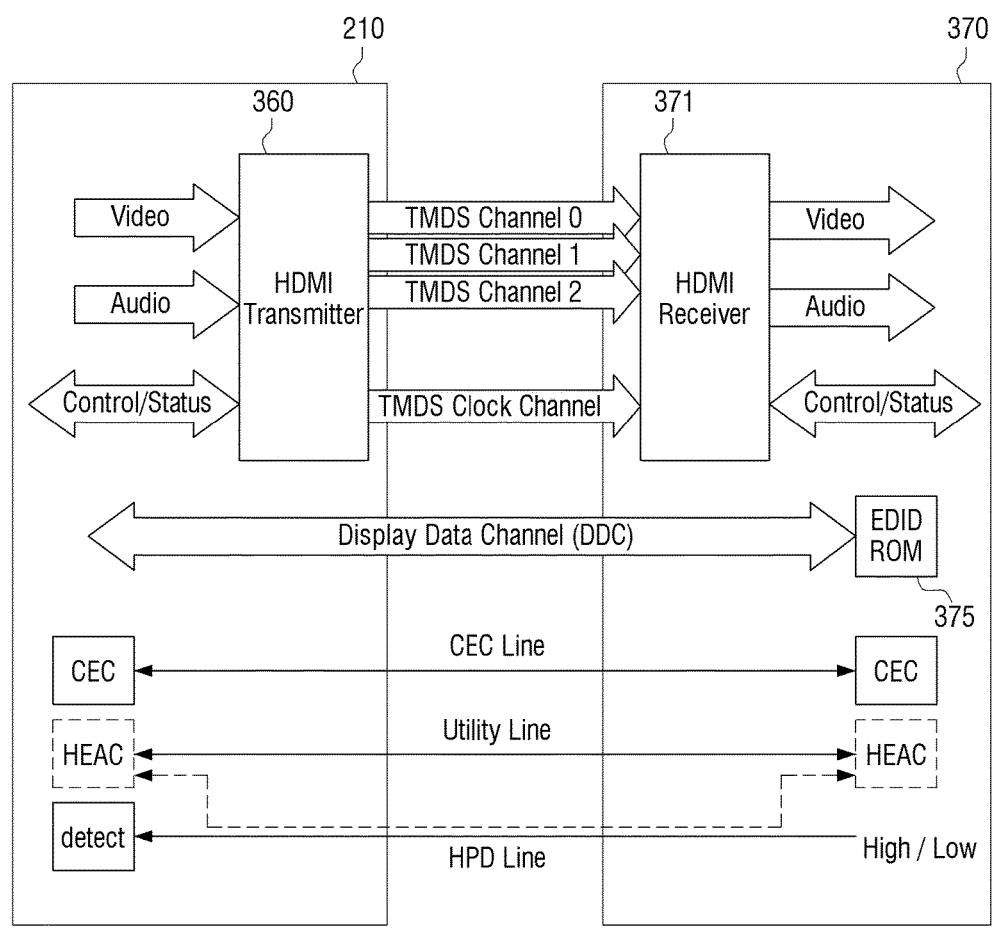
FIG. 5 is a view illustrating the connection of the second signal processor of FIG. 3 and a signal processor of the image display apparatus.

FIG. 5 is a view specifying the connection structure of the second signal processor of FIG. 3 and a signal processor of the image display apparatus.

For convenience of explanation, referring to FIG. 5 along with FIG. 3, the HDMI outputter 360 of the second signal processor 210 is connected to the HDMI inputter 371 of the image display apparatus 100 through a HDMI cable. Accordingly, the image processing apparatus 110 may retrieve information related to resolution of the image display apparatus 100 which is stored in the storage 375. According to an exemplary embodiment, during this process, when the controller 390 of the image display apparatus 100 determines a power-on state and provides the corresponding information to the image processing apparatus 110, the corresponding information may be provided only when there is a request from the image processing apparatus 110. In addition, the HDMI outputter 360 uses the TMDS signal output format as described above.

Figure 6:
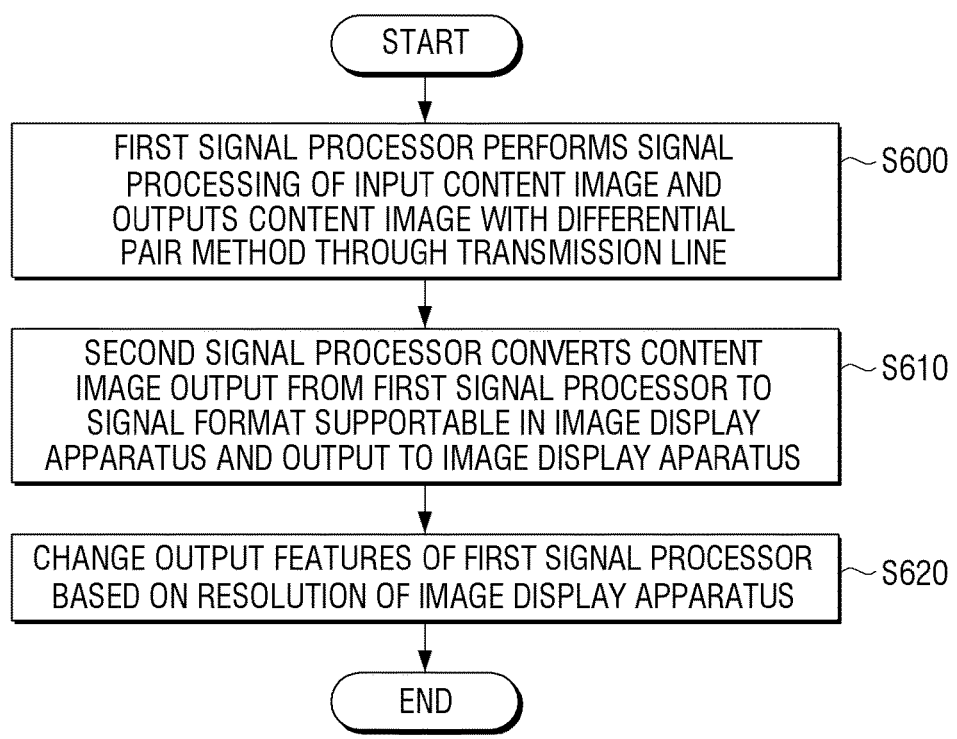
FIG. 6 is a flowchart illustrating an image processing method according to exemplary embodiments.

FIG. 6 is a flowchart illustrating an image processing method according to exemplary embodiments.

For convenience of understanding, referring to FIG. 6 along with FIG. 2, the image processing apparatus 110 according to the exemplary embodiment performs signal processing of a content image by the first signal processor 200 and outputs the image using a differential pair method through the transmission line, that is, using different lanes (S600). In this case, the differential pair method is desirably V-by-One. In other words, it is desirable that the differential pair is the same as the V-by-One interface method used by the image display apparatus 100.

Further, the second signal processor 210 converts a content image output from the first signal processor 200 to a signal format supportable by the image display apparatus 100 and outputs the converted content image to the image display apparatus 100 (S610).

Furthermore, the image processing apparatus 110, based on a resolution of the image display apparatus 100, changes the output features of the first signal processor 200 (S620). Herein, changing the output features may include changing the default number of lanes using information on resolution of the image display apparatus 100. It may further mean determining the optimal lane to be used for outputting data using information of a resolution of an image display apparatus 100 according to setting of a system manager, and determining transmission speed, as explained above.

Each component discussed herein may be combined with one or more components to provide a single device, or each component may be separate. In addition, all components, each one independent of the hardware, can be implemented as a program module to perform some or all of the features that some or all of each component, optionally in combination with one or a combination of multiple hardware and can be implemented as a computer program having codes and code segments to configure the computer program of the present invention so that those skilled in the art will readily understand. These computer programs are stored on a non-transitory computer readable media, and are read by the computer, such that an exemplary embodiment of the present invention can be implemented.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as compact disc (CD), digital video disk (DVD), hard disk, Blu-ray disk, USB, memory card, and read-only memory (ROM) and provided therein.

The foregoing embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the range of the claims, and many alternatives, modifications, and variations will be apparent to those skilled in the art.

What is claimed is:

1. An image processing apparatus which provides a processed image to an external display apparatus, the image processing apparatus comprising:
    a first signal processor configured to process a content image;
    a second signal processor; and
    a controller configured to:
        identify, in response to receiving extended display identification data (EDID) information of the external display apparatus, a resolution supported by the external display apparatus based on the EDID information,
        identify a number of transmission lanes required for transmitting to the second signal processor the content image, which is processed based on the identified resolution using a V-by-One interface, and
        control the first signal processor to transmit the processed content image to the second signal processor, based on the identified number of transmission lanes,
    wherein the second signal processor is configured to:
    convert the processed content image which is transmitted from the first processor to a high definition multimedia interface (HDMI) format, and transmit the converted content image to the external display apparatus using an HDMI interface.

2. The image processing apparatus as claimed in claim 1, wherein the first signal processor is further configured to:
    decode the content image,
    scale the decoded content image, and
    output the scaled content image using the V-by-One interface; and
    wherein the second signal processor is further configured to:
    receive the processed content image output from the first signal processor via the V-by-One interface.

3. The image processing apparatus as claimed in claim 1, wherein the controller is further configured to control the first signal processor to change a data speed of a content image transmitted through at least one transmission lane.

4. The image processing apparatus as claimed in claim 1, wherein the controller is configured to identify, based on the identified resolution, a minimum number of transmission lanes capable of data transmission for a content image as a number of lanes needed to optimally transmit the processed content image to the second signal processor.

5. The image processing apparatus as claimed in claim 1, wherein the controller is configured to use the EDID information to identify output features.

6. An image processing method for providing a processed image to an external display apparatus, the method comprising:
    identifying, by a controller, in response to receiving extended display identification data (EDID) information of the external display apparatus, a resolution supported by the external display apparatus based on the EDID information;
    identifying a number of transmission lanes required for transmitting a content image which is processed based on the identified resolution using a V-by-One interface;
    transmitting, by a first signal processor, the processed content image to a second signal processor based on the identified number of transmission lanes;
    converting, by the second signal processor, the processed content image which is transmitted from the first processor to a high definition multimedia interface (HDMI) format; and
    transmitting the converted content image to the external display apparatus using an HDMI interface.

7. The method as claimed in claim 6, wherein the transmitting the processed content image to the second signal processor comprises:
    decoding the content image;
    scaling the decoded content image; and
    outputting the scaled content image using the V-by-One interface; and
    wherein the converting the processed content image comprises:
    receiving the processed content image via the V-by-One interface.

8. The method as claimed in claim 6, wherein the converting comprises changing a data speed of a content image transmitted through at least one transmission lane.

9. The method as claimed in claim 6, wherein the identifying comprises identifying a minimum number of transmission lanes capable of data transmission for a content image as a number of lanes needed to optimally transmit the processed content image based on the identified resolution.

10. The method as claimed in claim 6, wherein the identifying comprises using the EDID information to identify output features.

* * * * *